(12) United States Patent
Ha et al.

(10) Patent No.: US 8,754,172 B2
(45) Date of Patent: Jun. 17, 2014

(54) ACRYLIC ADHESIVE COMPOSITION AND POLARIZER FILM USING THE SAME

(75) Inventors: Kyoung Jin Ha, Uiwang-si (KR); Irina Nam, Uiwang-si (KR); Lee Jun Kim, Uiwang-si (KR); Kil Sung Lee, Uiwang-si (KR); Eun Hwan Jeong, Uiwang-si (KR); Woo Jin Jeong, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 361 days.

(21) Appl. No.: 13/027,528

(22) Filed: Feb. 15, 2011

(65) Prior Publication Data

US 2012/0059127 A1    Mar. 8, 2012

(30) Foreign Application Priority Data

Sep. 2, 2010 (KR) ........................ 10-2010-0086200

(51) Int. Cl.
*C09J 133/14* (2006.01)
*C09J 137/00* (2006.01)
*C08J 3/24* (2006.01)
*C08F 8/30* (2006.01)

(52) U.S. Cl.
USPC .................. 525/326.8; 525/327.2; 525/328.9; 525/329.7; 525/329.9; 525/330.3; 525/330.5; 526/262; 526/270; 526/329.6

(58) Field of Classification Search
USPC .......... 525/327.2, 330.3, 330.5, 326.8, 328.9, 525/329.7, 329.9; 526/329.6, 262, 270
See application file for complete search history.

(56) References Cited

U.S. PATENT DOCUMENTS

| 5,047,443 | A | * | 9/1991 | Rehmer ........................... 522/46 |
| 2005/0196624 | A1 | * | 9/2005 | Kawamura et al. ........... 428/441 |
| 2009/0162577 | A1 | | 6/2009 | Inoue et al. |
| 2009/0208741 | A1 | * | 8/2009 | Toyama et al. ......... 428/355 AC |

FOREIGN PATENT DOCUMENTS

| CN | 1660916 A | 8/2005 |
| CN | 101463234 A | 6/2009 |
| CN | 101705057 A | 5/2010 |
| JP | 08-209083 | * 8/1996 |
| JP | 2000-171635 | * 6/2000 |

OTHER PUBLICATIONS

JP 08-209083, machine translation, Aug. 1996.*
Machine translation of JP 2000-171635, Jun. 2000.*
Chinese First Office Action in CN 201010624889.2 dated Aug. 1, 2012 (Ha, et al.).
Taiwanese Office Action in TW 099147267 with Taiwanese Search Report, and English translation of Search Report only, dated Jun. 5, 2013 (Ha, et al.).

* cited by examiner

*Primary Examiner* — Roberto Rabago
(74) *Attorney, Agent, or Firm* — Lee & Morse, P.C.

(57) ABSTRACT

An adhesive composition includes an acrylic copolymer having at least one alkyl group, at least one hydroxyl group, and at least one furyl based group; and a curing agent.

17 Claims, No Drawings

ACRYLIC ADHESIVE COMPOSITION AND POLARIZER FILM USING THE SAME

BACKGROUND

1. Field

Embodiments relate to an acrylic adhesive composition and a polarizer film using the same.

2. Description of the Related Art

A polarizing plate may be used as an optical member for a liquid crystal display (LCD). The polarizing plate may contain, e.g., iodine-based compounds or dichromatic polarization materials arranged in a constant direction. The polarizing plate may have a multilayer structure with protective films formed on both sides thereof to protect a polarizer film or other devices.

SUMMARY

An embodiment is directed to an adhesive composition including an acrylic copolymer having at least one alkyl group, at least one hydroxyl group, and at least one furyl based group; and a curing agent.

The acrylic copolymer may be a copolymer of a (meth)acrylic acid alkyl ester having an alkyl group, a (meth)acrylic acid ester having a hydroxyl group, and a compound having a furyl based group.

The acrylic copolymer may be a copolymer of about 60 wt % to about 98 wt % of the (meth)acrylic acid alkyl ester having an alkyl group, about 1 to about 10 wt % of the (meth)acrylic acid ester having a hydroxyl group, and about 1 wt % to about 30 wt % of the compound having a furyl based group.

The (meth)acrylic acid ester having a hydroxyl group may be at least one selected from the group of 2-hydroxyethyl (meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethyleneglycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl(meth)acrylate, 4-hydroxycyclohexyl(meth)acrylate, 2-hydroxy-3-phenyloxy(meth)acrylate, 4-hydroxycyclohexyl(meth)acrylate, and cyclohexane dimethanol mono (meth)acrylate.

The furyl based group may be a furyl group, a tetrahydrofuryl group, a furfuryl group, or a tetrahydrofurfuryl group.

The compound having a furyl based group may be at least one selected from the group of furfuryl isocyanate, tetrahydrofurfuryl isocyanate, furfuryl propionate, tetrahydrofurfuryl propionate, tetrahydrofurfuryl pentanoate, furfuryl pentanoate, and a compound having the following Formula 3:

wherein R is —H or —(CH$_2$)n-CH$_3$, n is an integer of 0 to about 5, and R1 is a furyl group, a tetrahydrofuryl group, a furfuryl group, or a tetrahydrofurfuryl group.

The acrylic copolymer may also have at least one of a silane group, an imide group, and a carboxylic group.

The acrylic copolymer may have the silane group, and the acrylic copolymer may be a copolymer of a (meth)acrylic acid alkyl ester having an alkyl group, a (meth)acrylic acid ester having a hydroxyl group, a compound having a furyl based group, and a monomer having a silane group.

The monomer having a silane group may be at least one selected from the group of 3-isocyanatopropyl trimethoxysilane, 3-isocyanatopropyl triethoxysilane, vinyl trichlorosilane, vinyl trimethoxysilane, and vinyl triethoxysilane.

The acrylic copolymer may have the imide group, and the acrylic copolymer may be a copolymer of a (meth)acrylic acid alkyl ester having an alkyl group, a (meth)acrylic acid ester having a hydroxyl group, a compound having a furyl based group, and a monomer having an imide group.

The monomer having an imide group may be at least one selected from the group of maleimide, phenyl maleimide, N-methyl maleimide, N-ethyl maleimide, N-propyl maleimide, N-isopropyl maleimide, N-butyl maleimide, N-isobutyl maleimide, N-t-butyl maleimide, N-cyclohexyl maleimide, N-chlorophenyl maleimide, N-methylphenyl maleimide, N-bromophenyl maleimide, N-naphthyl maleimide, N-lauryl maleimide, N-hydroxyphenyl maleimide, N-methoxyphenyl maleimide, N-carboxyphenyl maleimide, N-nitrophenyl maleimide, and N-benzyl maleimide.

The acrylic copolymer may have the carboxylic group, and the acrylic copolymer may be a copolymer of a (meth)acrylic acid alkyl ester having an alkyl group, a (meth)acrylic acid ester having a hydroxyl group, a compound having a furyl based group, and a monomer having a carboxylic group.

The monomer having a carboxylic group may have the following Formula 5:

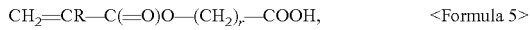

wherein R is —H or —(CH$_2$)$_n$—CH$_3$, n is an integer of 0 to about 5, and r is an integer of 1 to about 10.

The acrylic copolymer may be a copolymer of monomers having the following Formulae 1, 2, and 3:

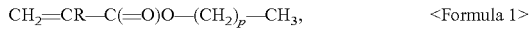

wherein R is —H or —(CH$_2$)$_n$—CH$_3$, n is an integer of 0 to about 5, and p is an integer of 0 to about 20;

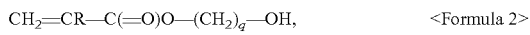

wherein R is —H or —(CH$_2$)$_n$—CH$_3$, n is an integer of 0 to about 5, and q is an integer of 1 to about 20;

wherein R is —H or —(CH$_2$)$_n$—CH$_3$, n is an integer of 0 to about 5, and R1 is a furyl group, a tetrahydrofuryl group, a furfuryl group, or a tetrahydrofurfuryl group.

The acrylic copolymer may also have a silane group, and the acrylic copolymer may be a copolymer of the monomers having the Formulae 1, 2, and 3 and a monomer having the following Formula 4:

wherein R2, R3, and R4 are halogen or an alkoxy group having 1 to 5 carbon atoms, s is from 0 to about 10, R5 is a vinyl group when s is 0, and R5 is —NCO when s is 1 to about 10.

The acrylic copolymer may also have a carboxyl group, and the acrylic copolymer may be a copolymer of the monomers having the Formulae 1, 2, and 3 and a monomer having the following Formula 5:

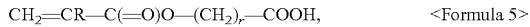

wherein R is —H or —(CH$_2$)$_n$—CH$_3$, n is an integer of 0 to about 5, and r is an integer of 1 to about 10.

The curing agent may be included in an amount of about 0.1 part to about 10 parts by weight based on 100 parts by weight of the acrylic copolymer.

The curing agent may be at least one selected from the group of 2,4-tolylene diisocyanate, 2,6-tolylene diisocyanate, hydrogenated tolylene diisocyanate, 1,3-xylene diisocyanate, 1,4-xylene diisocyanate, diphenylmethane-4,4-diisocyanate, 1,3-bisisocyanatomethyl cyclohexane, tetramethylxylene diisocyanate, 1,5-naphthalene diisocyanate, 2,2,4-trimethyl hexamethylene diisocyanate, tolylene diisocyanate adduct of trimethylolpropane, xylene diisocyanate adduct of trimethylolpropane, triphenylmethanetriisocyante, and methylene bis (triisocyanate).

The adhesive composition may further include a silane coupling agent.

Another embodiment is directed a polarizer film including an adhesive composition according to an embodiment.

DETAILED DESCRIPTION

Korean Patent Application No. 10-2010-0086200, filed on Sep. 2, 2010, in the Korean Intellectual Property Office, and entitled: "Acrylic Adhesive Composition and Polarizer Film Comprising the Same," is incorporated by reference herein in its entirety.

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art.

It will be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

An embodiment relates to an adhesive composition including: (A) an acrylic copolymer having at least one alkyl group, at least one hydroxyl group, and at least one furyl based group; and (B) a curing agent.

Acrylic Copolymer

The acrylic copolymer may have at least one alkyl group, at least one hydroxyl group, and at least one furyl based group.

In the acrylic copolymer, the positions of the alkyl group, the hydroxyl group, and the furyl based group are not specifically limited and may be suitably arranged as needed. Further, in the acrylic copolymer, the alkyl groups, the hydroxyl groups, or the furyl based groups may be consecutively arranged. The acrylic copolymer may be, e.g., a random or block copolymer.

In an embodiment, the acrylic copolymer may be obtained by copolymerization of: (a1) a (meth)acrylic acid alkyl ester having an alkyl group (providing the resultant acrylic copolymer with the alkyl group), (a2) a (meth)acrylic acid ester having a hydroxyl group (providing the resultant acrylic copolymer with the a hydroxyl group), and (a3) a compound having a furyl based group (providing the resultant acrylic copolymer with a furyl based group).

In an embodiment, the acrylic copolymer may be obtained by copolymerization of (a1) about 60 wt % to about 98 wt % of the (meth)acrylic acid alkyl ester having an alkyl group, (a2) about 1 wt % to about 10 wt % of the (meth)acrylic acid ester having a hydroxyl group, and (a3) about 1 wt % to about 30 wt % of the compound having a furyl based group.

In another embodiment, the acrylic copolymer may be obtained by copolymerization of (a1) about 65 wt % to about 85 wt % of the (meth)acrylic acid alkyl ester having an alkyl group, (a2) about 5 wt % to about 10 wt % of the (meth)acrylic acid ester having a hydroxyl group, and (a3) about 10 wt % to about 25 wt % of the compound having a furyl based group.

The (meth)acrylic acid alkyl ester having an alkyl group may be or include a (meth)acrylic acid alkyl ester having a linear or branched alkyl group with 1 to 20 carbon atoms in the ester moiety. For example, the (meth)acrylic acid alkyl ester may comprise a (meth)acrylic acid alkyl ester having a linear or branched alkyl group with 2 to 12 carbon atoms, preferably 3 to 8 carbon atoms in the ester moiety. The (meth)acrylic acid alkyl ester having an alkyl group may include, e.g., at least one selected from the group of methyl(meth)acrylate, ethyl(meth)acrylate, propyl(meth)acrylate, iso-propyl(meth)acrylate, n-butyl(meth)acrylate, t-butyl(meth)acrylate (i.e., tert-butyl(meth)acrylate), iso-butyl(meth)acrylate, s-butyl(meth)acrylate, pentyl(meth)acrylate, hexyl(meth)acrylate, heptyl(meth)acrylate, octyl(meth)acrylate, nonly(meth)acrylate, decyl(meth)acrylate, undecyl(meth)acrylate, and lauryl(meth)acrylate. For example, the (meth)acrylic acid alkyl ester having an alkyl group includes, but is not limited to, at least one selected from the group consisting of methyl(meth)acrylate, ethyl(meth)acrylate, propyl(meth)acrylate, iso-propyl(meth)acrylate, n-butyl(meth)acrylate, t-butyl(meth)acrylate, iso-butyl(meth)acrylate, s-butyl(meth)acrylate, pentyl(meth)acrylate, hexyl(meth)acrylate, heptyl(meth)acrylate and octyl(meth)acrylate.

The (meth)acrylic acid ester having an alkyl group may be used singly or as a combination of two or more of the above (meth)acrylic acid esters having an alkyl group.

The (meth)acrylic acid alkyl ester having an alkyl group to be copolymerized in the acrylic copolymer may be provided in an amount of about 60 wt % to about 98 wt % in the acrylic copolymer. Within this range, the adhesive composition may exhibit excellent initial adhesive strength and prevent the film from being stripped off at the periphery thereof during reliability testing. Further, stick slip may not occur during a rework process, thereby facilitating reworking. Further, during a cutting process, the adhesive composition may provide excellent workability without omission of an adhesive binder. In an embodiment, the (meth)acrylic acid alkyl ester having an alkyl group to be copolymerized in the acrylic copolymer may be provided in an amount of about 65 wt % to about 85 wt % in the acrylic copolymer.

In an embodiment, the (meth)acrylic acid ester having a hydroxyl group has a hydroxyl group at a terminal position of the ester moiety or in the structure thereof, and is copolymerizable with the (meth)acrylic acid alkyl ester having an alkyl group and/or the compound having a furyl based group. For example, the (meth)acrylic acid ester having a hydroxyl group may comprise a (meth)acrylic acid alkyl ester having a linear or branched alkyl group with 1 to 20 carbon atoms, preferably 1 to 10 carbon atoms, more preferably 2 to 6 carbon atoms with hydroxy groups in the ester moiety. The (meth)acrylic acid ester having a hydroxyl group may include, e.g., at least one selected from the group of 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl(meth)acrylate, 4-hydroxycyclohexyl(meth)acrylate, 2-hydroxy-3-phenyloxy(meth)acrylate, 4-hydroxycyclohexyl(meth)acrylate, and cyclohexane dimethanol mono(meth)acrylate. Particularly, the (meth)acrylic acid alkyl ester having a linear or branched alkyl group with 2 to 6 carbon atoms with hydroxy groups in the ester moiety, for example at least one selected from 2-hydroxyethyl(meth)acrylate, 4-hydroxybutyl(meth)acrylate, 2-hydroxypropyl(meth)acrylate, 2-hydroxybutyl (meth)acrylate and 6-hydroxyhexyl(meth)acrylate is most preferable. Further, 2-hydroxyethyl(meth)acrylamide may be used instead of the (meth)acrylic acid ester having a hydroxyl group.

The (meth)acrylic acid ester having a hydroxyl group may be used singly or as a combination of two or more of the above (meth)acrylic acid esters having a hydroxyl group.

The (meth)acrylic acid ester having a hydroxyl group to be copolymerized in the acrylic copolymer may be provided in an amount of about 1 wt % to about 10 wt % in the acrylic copolymer. Within this range, the acrylic copolymer may exhibit excellent crosslinking, a characteristic that is desirable to reduce burring during the cutting process of the adhesive film and to reduce transfer of the adhesive to a glass substrate during rework. The acrylic copolymer may also provide the adhesive with excellent initial adhesive strength. In an embodiment, the (meth)acrylic acid ester having a hydroxyl group to be copolymerized in the acrylic copolymer may be provided in an amount of about 5 wt % to about 10 wt % in the acrylic copolymer.

In an embodiment, the compound having a furyl based group has a furyl based group and is copolymerizable with (a1) the (meth)acrylic acid alkyl ester having an alkyl group and/or (a2) the (meth)acrylic acid ester having a hydroxyl group. In another embodiment, the compound having a furyl based group has a furyl based group and is capable of being coupled to the hydroxyl group of (a2) the (meth)acrylic acid ester having a hydroxyl group.

The furyl based group may be a furyl group or a modified furyl group, such as a tetrahydrofuryl group, a furfuryl group, or a tetrahydrofurfuryl group. In an embodiment, the furyl group is a tetrahydrofurfuryl group.

The compound having a furyl based group may include, e.g., at least one selected from the group of furfuryl isocyanate, tetrahydrofurfuryl isocyanate, furfuryl propionate, tetrahydrofurfuryl propionate, tetrahydrofurfuryl pentanoate, or furfuryl pentanoate. An example of the compound having a furyl based group includes tetrahydrofurfuryl(meth)acrylate.

The compound having a furyl based group may have the following Formula 3:

$$CH_2=CR-C(=O)O-R1 \qquad \text{<Formula 3>}$$

wherein R is —H or —$(CH_2)_n$—$CH_3$; n is an integer from 0 to 5; and R1 is a furyl group, a tetrahydrofuryl group, a furfuryl group or a tetrahydrofurfuryl group.

Examples of the compound represented by Formula 3 may include furfuryl(meth)acrylate or tetrahydrofurfuryl(meth)acrylate.

The compound having a furyl based group may be used singly or as a combination of two or more of the above compounds having a furyl based group.

The compound having a furyl based group to be copolymerized in the acrylic copolymer may be provided in an amount of about 1 wt % to about 30 wt % in the acrylic copolymer. Within this range, the adhesive composition may exhibit excellent thermal resistance and may not cause light leakage (which may be manifested as a condition wherein the periphery of a liquid crystal device is brighter than the center thereof) even after 250 hours at a relative humidity of 90% and at 60° C. or 85° C. In an embodiment, the compound having a furyl based group to be copolymerized in the acrylic copolymer may be provided in an amount of about 10 wt % to about 25 wt % in the acrylic copolymer.

In an embodiment, the acrylic copolymer may include at least one silane group, at least one imide group, and/or at least one carboxylic group, in addition to the at least one alkyl group, at least one hydroxyl group, and at least one furyl based group.

In an embodiment, the acrylic copolymer may include at least one alkyl group, at least one hydroxyl group, at least one furyl based group, and at least one silane group. Herein, the term "silane", "silane group" means silane ($SiH_4$) or silane having one to three substituents, for example, silane substituted with one to three halogen or silane substituted with one to three straight or branched alkoxy of C1-C6 such as alkoxysilane or alkoxysilyl group.

In the acrylic copolymer, the positions of the alkyl group, the hydroxyl group, the furyl based group, and the silane group are not specifically limited and may be suitably arranged as needed. Further, in the acrylic copolymer, the alkyl groups, the hydroxyl groups, the furyl based groups, or the silane groups may be consecutively arranged. The acrylic copolymer including the silane group may be obtained through copolymerization of the monomer having a silane group in addition to (a1) the (meth)acrylic acid alkyl ester having an alkyl group, (a2) the (meth)acrylic acid ester having a hydroxyl group, and (a3) the compound having a furyl based group.

In an embodiment, the monomer having a silane group has the silane or silane group, and is capable of being coupled to the hydroxyl group of the (meth)acrylic acid ester having the hydroxyl group. In an embodiment, the monomer having a silane group may be coupled to the hydroxyl group of the (meth)acrylic acid ester having a hydroxyl group through an isocyanate moiety.

The monomer having a silane group may include, e.g., at least one selected from the group of 3-isocyanatopropyl trimethoxysilane, 3-isocyanatopropyl triethoxysilane, vinyl trichlorosilane, vinyl trimethoxysilane, and vinyl triethoxysilane. In an embodiment, the monomer having a silane group is 3-isocyanatopropyl triethoxysilane.

The monomer having a silane group may be used singly or as a combination of two or more of the above monomers having a silane group.

The monomer having a silane group to be copolymerized in the acrylic copolymer may be provided in an amount of about 0.01 part to about 5 parts, preferably about 1-4 parts by weight based on 100 parts by weight of the acrylic copolymer. Within this range, the adhesive composition may exhibit excellent adhesive strength with respect to a glass substrate and excellent storage stability of the acrylic copolymer.

In another embodiment, the acrylic copolymer may have at least one alkyl group, at least one hydroxyl group, at least one furyl based group, and at least one imide group.

In the acrylic copolymer, the positions of the alkyl group, the hydroxyl group, the furyl based group, and the imide group are not specifically limited and may be suitably arranged as needed. Further, in the acrylic copolymer, the alkyl groups, the hydroxyl groups, the furyl based groups, or the imide groups may be consecutively arranged. The acrylic copolymer including the imide group may be obtained through copolymerization of a monomer having an imide group in addition to (a1) the (meth)acrylic acid alkyl ester having an alkyl group, (a2) the (meth)acrylic acid ester having a hydroxyl group, and (a3) the compound having a furyl based group.

The monomer having an imide group may include, e.g., at least one selected from the group of maleimide, phenyl maleimide, N-methyl maleimide, N-ethyl maleimide, N-propyl maleimide, N-isopropyl maleimide, N-butyl maleimide, N-isobutyl maleimide, N-t-butyl maleimide, N-cyclohexyl maleimide, N-chlorophenyl maleimide, N-methylphenyl maleimide, N-bromophenyl maleimide, N-naphthyl maleimide, N-lauryl maleimide, N-hydroxyphenyl maleimide, N-methoxyphenyl maleimide, N-carboxyphenyl maleimide, N-nitrophenyl maleimide, and N-benzyl maleimide. In an embodiment, the monomer having the imide group is phenyl maleimide.

The monomer having an imide group may be used singly or as a combination of two or more of the above monomers having an imide group.

The monomer having an imide group to be copolymerized in the acrylic copolymer may be provided in an amount of about 1 wt % to about 20 wt % in the acrylic copolymer. Within this range, the adhesive composition may exhibit excellent thermal resistance and may not cause light leakage.

In another embodiment, the acrylic copolymer may have at least one alkyl group, at least one hydroxyl group, at least one furyl based group, and at least one carboxyl group.

In the acrylic copolymer, the positions of the alkyl group, the hydroxyl group, the furyl based group, and the carboxyl group are not specifically limited and may be suitably arranged as needed. Further, in the acrylic copolymer, the alkyl groups, the hydroxyl groups, the furyl based groups, or the carboxyl groups may be consecutively arranged. The acrylic copolymer having the carboxyl group may be obtained through copolymerization of a monomer having a carboxyl group in addition to (a1) the (meth)acrylic acid alkyl ester having an alkyl group, (a2) the (meth)acrylic acid ester having a hydroxyl group, and (a3) the compound having a furyl based group.

In an embodiment, the monomer having a carboxyl group is a (meth)acrylic acid ester having a carboxyl group.

The monomer having a carboxyl group may have the following Formula 5:

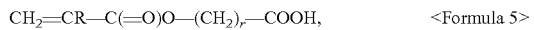

wherein R is —H or —(CH$_2$)$_n$—CH$_3$, n is an integer of 0 to about 5, and r is an integer of 1 to about 10.

For example, the monomer having a carboxyl group may be 2-carboxyethyl(meth)acrylate.

The monomer having a carboxyl group may be used singly or as a combination of two or more of the above monomers having a carboxyl group.

The monomer having a carboxyl group to be copolymerized in the acrylic copolymer may be provided in an amount of about 1 wt % to about 20 wt % in the acrylic copolymer. Within this range, the adhesive composition may exhibit excellent thermal resistance and may not cause light leakage.

Aromatic Functional Group

In an embodiment, the acrylic copolymer may include an aromatic functional group.

In the acrylic copolymer, a monomer having an aromatic functional group to be copolymerized in the acrylic copolymer may be provided in an amount of about 1 part to about 20 parts by weight based on 100 parts by weight of the acrylic copolymer. Within this range, the adhesive composition may exhibit excellent thermal resistance and may not cause light leakage. In an embodiment, the monomer having an aromatic functional group may be provided in an amount of about 5 parts to about 15 parts by weight based on 100 parts by weight of the acrylic copolymer.

The monomer having an aromatic functional group may include, e.g., at least one selected from the group of phenyl (meth)acrylate, phenoxyethyl(meth)acrylate, benzyl(meth) acrylate, phenoxy diethyleneglycol(meth)acrylate, ethyleneoxide modified nonylphenol(meth)acrylate, hydroxy ethylate β-naphthol acrylate, biphenyl(meth)acrylate, styrene, vinyl toluene, and α-methyl styrene.

The monomer having an aromatic functional group may be used singly or as a combination of two or more of the above monomers having an aromatic functional group.

In an embodiment, the acrylic copolymer may be obtained by copolymerization of monomers having at least one of the following Formulae 1, 2, and 3:

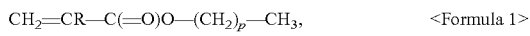

wherein R is —H or —(CH$_2$)$_n$—CH$_3$, n is an integer of 0 to about 5, and p is an integer of 0 to about 20;

For example, p is an integer of 0-19, 1-11, preferably 2-7.

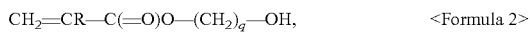

wherein R is —H or —(CH$_2$)$_n$—CH$_3$, n is an integer of 0 to about 5, and q is an integer of 1 to about 20;

For example, q is an integer of 1-10, preferably 2-6, and

wherein R is —H or —(CH$_2$)$_n$—CH$_3$, n is an integer of 0 to about 5, and R1 is a furyl group, a tetrahydrofuryl group, a furfuryl group, or a tetrahydrofurfuryl group.

For example, n is an integer of 0-3, preferably 0-1.

In the acrylic copolymer, the positions of the monomers having Formulae 1, 2, and 3 are not specifically limited and the same monomers may be consecutively arranged.

In an embodiment, in the acrylic copolymer, the monomers having Formulae 1, 2, and 3 may be copolymerized at a molar ratio of about:

| 65 to 90 (Formula 1) | 1 to 10 (Formula 2) | 5 to 25 (Formula 3) |
| --- | --- | --- | and such a ratio may provide the adhesive composition with desirable characteristics. For example, the acrylic polymer may provide the adhesive composition with characteristics that prevent light leakage, and provide exhibit excellent thermal resistance and high peel strength, thereby eliminating re-peeling while preventing delamination. In an embodiment, the monomers having Formulae 1, 2 and 3 may be copolymerized at a molar ratio of about 67 to 87:5 to 10:8 to 23.

In another embodiment, the acrylic copolymer may be obtained by copolymerization of monomers having the following Formulae 1, 2, 3 and 4.

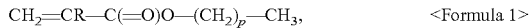

wherein R is —H or —(CH$_2$)$_n$—CH$_3$, n is an integer of 0 to about 5, and p is an integer of 0 to about 20.

For example, p is an integer of 0-19 or 1-11, preferably 2-7;

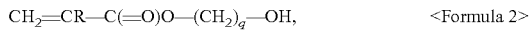

wherein R is —H or —(CH$_2$)$_n$—CH$_3$, n is an integer of 0 to about 5, and q is an integer of 1 to about 20;

For example, q is an integer of 1-10, preferably 2-6.

wherein R is —H or —(CH2)n-CH3, n is an integer of 0 to about 5, and R1 is a furyl group, a tetrahydrofuryl group, a furfuryl group, or a tetrahydrofurfuryl group;

For example, n is an integer of 0-3, preferably 0-1.

  <Formula 4> wherein R2, R3, and R4 are halogen or alkoxy groups having 1 to 5 carbon atoms, R5 is a vinyl group when s is 0, and R5 is —NCO (isocyanate) when s is 1 to about 10.

For example, the R2, R3 and R4 are alkoxy groups having 1 to 4 carbon atoms.

In the acrylic copolymer, the positions of the monomers having Formulae 1, 2, 3, and 4 are not specifically limited and the same monomers may be consecutively arranged.

In an embodiment, in the acrylic copolymer, the monomers having Formulae 1, 2, 3 and 4 may be copolymerized at a molar ratio of about:

| 65 to 90 (Formula 1) | 1 to 10 (Formula 2) | 5 to 25 (Formula 3) | 0.1 to 5 (Formula 4) |
| --- | --- | --- | --- | and such a ratio may provide the adhesive composition with desirable characteristics. For example, the acrylic copolymer may provide the adhesive composition with characteristics that reduce or eliminate uneven adhesive strength, which would occur if a silane coupling agent is separately used. Further, the adhesive composition may exhibit excellent bonding strength with respect to a glass substrate and excellent storage stability of the acrylic copolymer. In an embodiment, the monomers having Formulae 1, 2, 3, and 4 may be copolymerized at a molar ratio of about 67 to 87:5 to 10:8 to 23:0.5 to 2.5.

In the acrylic copolymer, the monomer having Formula 4 may be copolymerized with a main chain of the acrylic copolymer or coupled to the hydroxyl group of Formula 2.

The acrylic copolymer may have a weight average molecular weight of about 600,000 g/mol to about 2,000,000 g/mol, for example, about 800,000 g/mol to about 1,500,000 g/mol. In the range of 600,000 g/mol to about 2,000,000 g/mol, copolymerization of the acrylic copolymer may be easily carried out.

The acrylic copolymer may have a polydispersity index of about 2 to about 10, preferably 2 or more to less than 10, and more preferably 3 to about 5. Within this range, the acrylic copolymer may have a narrow molecular weight distribution and provide uniform adhesive strength while eliminating light leakage.

Curing Agent

The adhesive composition may include about 0.1 part to about 10 parts by weight of a curing agent, based on 100 parts by weight of the acrylic copolymer. For example, the adhesive composition may include about 0.3-5 parts by weight of a curing agent based on 100 parts by weight of the acrylic copolymer.

The curing agent may be, e.g., a thermal curing agent. The curing agent may include, e.g., at least one selected from the group of isocyanate curing agents, epoxy curing agents, aziridine curing agents, melamine curing agents, amine curing agents, imide curing agents, carbodiimide curing agents, and amide curing agents. The isocyanate thermal curing agent may be advantageously used.

An isocyanate thermal coupling agent may be used. The isocyanate thermal curing agent may include at least one selected from the group of 2,4-tolylene diisocyanate, 2,6-tolylene diisocyanate, hydrogenated tolylene diisocyanate, 1,3-xylene diisocyanate, 1,4-xylene diisocyanate, diphenyl-methane-4,4-diisocyanate, 1,3-bisisocyanatomethyl cyclohexane, tetramethylxylene diisocyanate, 1,5-naphthalene diisocyanate, 2,2,4-trimethyl hexamethylene diisocyanate, tolylene diisocyanate adduct of trimethylolpropane, xylene diisocyanate adduct of trimethylolpropane, triphenylmethane triisocyante, and methylene bis(triisocyanate).

Silane Coupling Agent

In an embodiment, the adhesive composition includes: (A) the acrylic copolymer having at least one alkyl group, at least one hydroxyl group, and at least one furyl based group; and (B) the curing agent, and may further include (C) a silane coupling agent.

The silane coupling agent may be present in an amount of about 0.01 part to about 5 parts by weight, based on 100 parts by weight of the acrylic copolymer. For example, the silane coupling agent may be present in an amount of about 0.05-4 parts by weight based on 100 parts by weight of the acrylic copolymer.

Within this range, the adhesive composition may exhibit excellent adhesive strength with respect to a glass substrate and excellent storage stability of the acrylic copolymer.

The silane coupling agent may include, e.g., at least one selected from the group of: silicon compounds containing a polymerizable unsaturated group, such as vinyltrimethoxysilane, vinyltriethoxysilane, and (meth)acryloxypropyltrimethoxysilane; silicon compounds having an epoxy structure, such as 3-glycidoxypropyltrimethoxysilane, 3-glycidoxypropylmethyldimethoxysilane, and 2-(3,4-epoxycyclohexyl)ethyltrimethoxysilane; amino group-containing silicon compounds, such as 3-aminopropyltrimethoxysilane, N-(2-aminoethyl)-3-aminopropyltrimethoxysilane, and N-(2-aminoethyl)-3-aminopropylmethyldimethoxysilane; 3-chloropropyltrimethoxysilane, and the like.

Preparing the adhesive composition according to an embodiment may include: preparing an acrylic copolymer through copolymerization of (a1) the (meth)acrylic acid alkyl ester having an alkyl group, (a2) the (meth)acrylic acid ester having a hydroxyl group, and (a3) the compound having a furyl based group (first step); and adding a curing agent to the acrylic copolymer (second step).

First Step

In the first step, the acrylic copolymer binder may be prepared. For example, the acrylic copolymer may be prepared by adding an initiator to (a1) the (meth)acrylic acid alkyl ester having an alkyl group, (a2) the (meth)acrylic acid ester having a hydroxyl group, and (a3) the compound having a furyl based group for the copolymerization thereof.

The initiator may include, e.g., at least one selected from the group of 2,2-azobis(2,4-dimethylvaleronitrile), azobisisobutyronitrile, benzoyl peroxide, dilauroyl peroxide, tert-butyl-(2-ethylhexyl)monoperoxycarbonate, tert-amyl-(2-ethylhexyl)monoperoxycarbonate, 1,1-di(tert-butyl peroxy) cyclohexane, 1,1-di(tert-amyl peroxy)cyclohexane, tert-butyl peroxy-3,5,5-trimethylhexanoate, 1,1-di(tert-butyl peroxy)-3,3,5-trimethylcyclohexane, potassium persulfate, sodium persulfate, ammonium persulfate, and azo-based water-soluble initiators. Azobisisobutyronitrile (AIBN) may be advantageously used as the initiator.

The initiator may be added in an amount of about 0.001 part to about 2 parts by weight, based on 100 parts by weight of (a1) the (meth)acrylic acid alkyl ester having an alkyl group.

In the first step, a solvent may be added to dissolve (a1) the (meth)acrylic acid alkyl ester having an alkyl group, (a2) the (meth)acrylic acid ester having a hydroxyl group, and (a3) the compound having a furyl based group. A solvent such as ethyl acetate may be used.

In the first step, at least one of the monomer having a silane group, the monomer having an imide group, and the monomer having a carboxylic group may be further added in the copolymerization of the acrylic copolymer.

The temperature and duration of copolymerization may be suitably adjusted. For example, the copolymerization of the acrylic copolymer may be carried out for about 6 hours to about 8 hours at a temperature of about 65° C. to about 70° C.

In the first step, catalyst for curing may be further added. The catalyst may be added in the amount of about 0.01-3 parts based on the 100 parts of the curing agent. For example, the catalyst may include at least one selected from the group consisting of 1,4-diazabicyclo[2,2,2]octane, bis(2-dimethylaminoethyl)ether, trimethylaminoethylethanolamine, N,N,N',N',N''-pentamethyldiethylenetriamine, N,N'-dimethylethanolamine, dimethylaminopropylamine, N-ethylmorpholine, N,N-dimethylaminoethylmorpholine, N,N-dimethylcyclohexylamine, 2-methyl-2-azanorbornane, dibutyltin dilaurate, stannous octoate, dibutyltin diacetate and dibutyltin dimercaptide.

Second Step

In the second step, the curing agent may be added to the acrylic copolymer to prepare a final acrylic adhesive composition. The preparation of the adhesive composition may be carried out by, e.g., a method in which the acrylic copolymer and the curing agent are added to a solvent such as methyl ethyl ketone, followed by stirring at about 25° C. for about 30 minutes to about 60 minutes, thereby preparing the adhesive composition.

In the second step, the silane coupling agent may be further added to the acrylic copolymer.

Another embodiment relates to a polarizer film including the adhesive composition. In the polarizer film, the adhesive composition may be used as an adhesive agent for compensation films including a polarizer constituting the polarizer film, a transparent support, a phase difference film, and the like.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect. Details apparent to those skilled in the art may be omitted for clarity.

EXAMPLES

Preparation Example 1

Preparation of Acrylic Copolymer

In a 1 L four-neck round bottom flask, 60 g of ethyl acetate, 75 g of butyl acrylate (providing an alkyl group), 8 g of 4-hydroxybutyl acrylate (providing a hydroxyl group), and 10 g of tetrahydrofurfuryl methacrylate (providing a furyl group) were placed and heated to 70° C. 0.08 g of azobisisobutyronitrile as an initiator was dissolved in 20 g of ethyl acetate and added to the flask. An acrylic copolymer having at least one alkyl group, at least one hydroxyl group, and at least one furyl based group was then prepared through reaction at 65° C. for 5 hours. The overall reaction was carried out while supplying nitrogen at 10 cc/min. The prepared acrylic copolymer had a viscosity of 9,000 cps and a solid content of 25%. Further, the prepared acrylic copolymer had a weight average molecular weight of 900,000 g/mol and a polydispersity index of 3.8. The viscosity was measure Brookfield viscometer DV-II+ at 25° C., using Spindle No. #7. The polydispersity was measured by dissolving the acrylic copolymer 0.01 g in THF 10 ml, and filtering the dissolved acrylic copolymer through 0.45 µm syringe filter. The polydispersity may be measured by dividing the weight average molecular weight into number average molecular weight. As detector, Waters 2414 RI detector was used. As standard samples, 10 species of Polystyrene Shodex SM-105 were used.

Preparation Example 2

Preparation of Acrylic Copolymer

In a 1 L four-neck round bottom flask, 60 g of ethyl acetate, 70 g of butyl acrylate, 8 g of 4-hydroxybutyl acrylate, and 20 g of tetrahydrofurfuryl methacrylate were placed and heated to 70° C. 0.08 g of azobisisobutyronitrile as an initiator was dissolved in 20 g of ethyl acetate and added to the flask. After 3 hours, 320 g of ethyl acetate was added and the temperature was lowered to 40° C. After the resultant was cooled, 2g of 3-isocyanatopropyl triethoxysilane and 0.01 g of DBTDL (dibutyltin dilaurate) as a catalyst were added, followed by reaction for 12 hours. The overall reaction was carried out while supplying nitrogen at 10 cc/min. The prepared acrylic copolymer had a viscosity of 8,800 cps and a solid content of 25%. Further, the prepared acrylic copolymer had a weight average molecular weight of 850,000 g/mol and a polydispersity index of 4.3.

Preparation Example 3

Preparation of Acrylic Copolymer

In a 1 L four-neck round bottom flask, 60 g of ethyl acetate, 75 g of butyl acrylate, 8 g of 4-hydroxybutyl acrylate, and 10 g of tetrahydrofurfuryl methacrylate were placed and heated to 70° C. 0.08 g of azobisisobutyronitrile as an initiator was dissolved in 20 g of ethyl acetate and added to the flask. After 3 hours, 320 g of ethyl acetate was added and the temperature was lowered to 40° C. After the resultant was cooled, 2 g of 3-isocyanatopropyl triethoxysilane and 0.01 g of DBTDL (dibutyltin dilaurate) as a catalyst were added, followed by reaction for 12 hours. The overall reaction was carried out while supplying nitrogen at 10 cc/min. The prepared acrylic copolymer had a viscosity of 10,500 cps and a solid content of 25%. Further, the prepared acrylic copolymer had a weight average molecular weight of 820,000 g/mol and a polydispersity index of 4.2.

Preparation Example 4

Preparation of Acrylic Copolymer

An acrylic copolymer was prepared in the same manner as in Preparation Example 1, except that 10 g of tetrahydrofurfuryl methacrylate was not added, such that the resultant acrylic copolymer did not include at least one furyl based group.

Preparation Example 5

Preparation of Acrylic Copolymer

An acrylic copolymer was prepared in the same manner as in Preparation Example 3, except that 10 g of tetrahydrofurfuryl methacrylate was not added, such that the resultant acrylic copolymer did not include at least one furyl based group.

Examples 1 to 3 and Comparative Examples 1 and 2

Each of the prepared acrylic copolymers, a curing agent, and, in some cases, a silane compound were added in the weight ratios (parts by weight, solid content) shown in Table 1 to 10 parts by weight of methyl ethyl ketone, followed by stirring at 25° C. for 30 minutes, thereby preparing an adhesive composition.

TABLE 1

|  |  | Example | | | Comparative Example | |
|---|---|---|---|---|---|---|
|  |  | 1 | 2 | 3 | 1 | 2 |
| Acrylic copolymer | Preparation Example 1 | 97 | — | — | — | — |
|  | Preparation Example 2 | — | 98 | — | — | — |
|  | Preparation Example 3 | — | — | 98 | — | — |
|  | Preparation Example 4 | — | — | — | 97 | — |
|  | Preparation Example 5 | — | — | — | — | 98 |
| Curing agent 1 | | 0.5 | 2 | — | 0.5 | — |
| Curing agent 2 | | — | — | 2 | — | 2 |
| Silane Compound | | 2.5 | — | — | 2.5 | — |

Notes regarding Table 1:
Curing agent 1: trimethylolpropane modified toluene diisocyanate(TDI adduct type) (AK-75, Aekyung Chem. Co. Ltd.);
Curing agent 2: modified hexamethylene isocyanate(Modified HDI Trimer) (DN-955, Aekyung Chem. Co. Ltd.);
Silane compound (silane coupling agent): 3-glycidoxypropylmethoxysilane (KBM-403, Shinetsu Chemical Industries Co., Ltd.)

Each of the adhesive compositions was evaluated in terms of the following properties and the results are shown in Table 2.

Evaluation Method

1. Visual Inspection of Coating Liquid

The adhesive compositions of Examples and Comparative Examples were left for 1 week at room temperature, followed by visual inspection of transparency/opaqueness thereof.

2. Peel Strength (gf/25 mm)

180° peel strength between the adhesive composition and a glass substrate was measured according to JIS 2107. A specimen of the adhesive composition was cut to 25 mm×100 mm and laminated on a glass surface. Then, after connecting the adhesive layer and the glass substrate to upper and lower jigs in a 30 kgf load cell using a texture analyzer, load was measured while performing peeling at a tensile speed of 300 mm/min 3. Cutting Properties/Rework Properties A polarizing plate coated with each of the adhesive compositions prepared in Examples and Comparative Examples was cut to 400 mm×250 mm with a Thomson cutter and the cut cross-section of the polarizing plate was observed. The polarizing plates were bonded to both sides of a glass substrate through the adhesive composition and were subjected to a pressure of 4 kg/cm² to about 5 kg/cm² to prepare a specimen. After the specimen was left for 6 hours at 70° C., the residue on the surface of the glass substrate was observed while slowly cooling to room temperature over the course of 1 hour. The evaluation criteria were as follows.

○: No adhesive residue on the cut cross-section and complete removal of the adhesive therefrom (No transfer of the adhesive during rework)

□: Slight adhesive residue on the cut cross-section and slightly incomplete removal of the adhesive therefrom (Slight transfer of the adhesive during rework)

x: Prominent residues of the adhesive and incomplete removal of the adhesive therefrom (Transfer of the adhesive occurred during rework)

4. Light Leakage (Uniformity of Light Transmittance)

Using the same specimens as those in the following durability test, uniformity of light transmittance was evaluated. For determination of the uniformity of light transmittance, light leakage was observed using a backlight in a darkroom. The coated polarizing plates (400 mm×200 mm) were attached to both sides of a glass substrate (400 mm×200 mm×15 mm) such that the optical axes of the polarizing plates crossed each other. Each of the specimens was kept at 80° C. for 250 hours or under high humidity conditions, that is, at a temperature of 60° C. and a relative humidity of 90% for 250 hours, and then was left at room temperature for over 1 hour prior to measurement. Evaluation criteria are as follows.

○: Difficult to visually determine non-uniformity of light transmittance

Δ: Slight non-uniformity of light transmittance x: Prominent non-uniformity of light transmittance 5. Adhesive Creep (mm)

A polarizing plate coated with each of the adhesive compositions prepared in Examples and Comparative Examples was cut to 1.5 cm×1.5 cm, attached to a glass substrate, and left at room temperature for 3 days to prepare a specimen. Adhesive creep was measured in terms of a sheared distance of the specimen (mm) upon application of a force of 2 kgf to the specimen for 10 minutes using a Universal Test Machine (UTM).

6. Durability

Polarizing plates (100 mm×175 mm) coated with the adhesive compositions prepared in Examples and Comparative Examples were attached to both sides of a glass substrate by applying a pressure of 4 kg/cm² to about 5 kg/cm² to the polarizing plates to prepare specimens. In this case, the preparation of the specimens was carried out in a clean room to prevent bubbles or foreign matter from being formed on the specimens. The prepared specimens were left at 80° C. for 500 hours and the generation of bubbles or delamination of the specimens was observed to evaluate thermal resistance. To evaluate heat/humidity resistance, the specimens were left under conditions of 60° C. and a relative humidity of 90% for 500 hours and the generation of bubbles or delamination was observed. Observation was carried out with the naked eye or using a microscope after leaving the specimens at room temperature for 1 hour immediately before evaluation. Evaluation criteria were as follows.

○: No bubble or delamination, □: Slight bubbling or delamination, x: Prominent bubbling or delamination

TABLE 2

| | Example | | | Comparative Example | |
|---|---|---|---|---|---|
| Evaluation Item | 1 | 2 | 3 | 1 | 2 |
| Appearance of coating liquid | transparent | transparent | transparent | transparent | transparent |
| Peel strength (gf/25 mm) | 280 | 220 | 330 | 500 | 550 |
| Cutting properties/ rework properties | ○ | ○ | ○ | ○ | Δ |
| Light leakage (uniformity of light transmittance) | ○ | ○ | ○ | x | x |

TABLE 2-continued

| Evaluation Item | | Example | | | Comparative Example | |
|---|---|---|---|---|---|---|
| | | 1 | 2 | 3 | 1 | 2 |
| Adhesive creep (mm) | | 0.162 | 0.173 | 0.183 | 0.384 | 0.409 |
| Dura-bility | Thermal resistance | ○ | ○ | ○ | Δ | Δ |
| | High humidity resistance | ○ | ○ | ○ | Δ | Δ |

As can be seen from Table 2, the adhesive compositions of the inventive examples exhibited excellent durability, remarkable adhesive strength and high peel strength while preventing light leakage (see Examples 1 to 3). The adhesive composition comprising an acrylic copolymer with a furyl based group introduced into the main chain thereof exhibits excellent effects of suppressing light leakage while improving thermal resistance (Examples 1 and 3, Comparative Examples 1 and 2).

As described above, embodiments relate to an acrylic adhesive composition and a polarizer film using the same. The adhesive composition may prevent light leakage of the polarizer film. Respective films constituting a polarizing plate of a multilayer structure may be composed of materials having different molecular structures and compositions. As a result, the respective films of the polarizing plate may exhibit different physical properties. For example, when an optical film is used for a long period of time under high temperature and high humidity conditions, internal stress caused by dimensional variation of the optical film may be concentrated on the periphery rather than the center of the optical film, causing the light leakage phenomenon wherein the periphery of a liquid crystal device is brighter than the center thereof.

Various adhesive compositions may be considered in an effort to prevent light leakage. As an example, an adhesive composition may be prepared using an acrylic adhesive binder that contains butyl acrylate as a main component and is terminated only with alkyl groups, in order to maximize stress relief. Such an acrylic adhesive binder may have a molecular weight of 1,500,000 g/mol to about 2,000,000 g/mol, and a small amount of thermal curing agent may be used to maximize flexibility of a coating film. However, such an acrylic adhesive binder terminated only with the alkyl groups may ensure complete prevention of light leakage under hot conditions, or hot and humid conditions. In another example, an adhesive composition may have an acrylic adhesive binder, an isocyanate thermal curing agent, and a silane coupling agent. The silane coupling agent may be added to improve adhesive strength with respect to a glass substrate. However, when trace amounts of a silane coupling agent are added, problems may occur during blending. Further, in the case where stirring is not easily carried out, adhesive strength of the adhesive composition may become uneven after the formation of the polarizer film. By comparison, as described above, an acrylic adhesive composition according to an embodiment contains an acrylic copolymer terminated with an alkyl group, a hydroxyl group, and a furyl based group that prevent light leakage and provide other desirable characteristics such as reducing burring, transfer to a glass substrate, providing excellent bonding strength, etc.

Example embodiments have been disclosed herein, and although specific terms are employed, they are used and are to be interpreted in a generic and descriptive sense only and not for purpose of limitation. For example, elements described in connection with a particular embodiment may be used singly or in combination with elements described in connection with another embodiment. Accordingly, it will be understood by those of skill in the art that various changes in form and details may be made without departing from the spirit and scope of the present invention as set forth in the following claims.

What is claimed is:

1. An adhesive composition, comprising:
an acrylic copolymer having at least one alkyl group, at least one hydroxyl group, at least one furyl based group, and at least one imide group; and
a curing agent,
wherein the acrylic copolymer is a copolymer of monomers that include: a (meth)acrylic acid alkyl ester having an alkyl group; a (meth)acrylic acid ester having a hydroxyl group; a compound having a furyl based group; and a monomer having an imide group,
wherein the monomer having an imide group is at least one selected from the group of maleimide, phenyl maleimide, N-methyl maleimide, N-ethyl maleimide, N-propyl maleimide, N-isopropyl maleimide, N-butyl maleimide, N-isobutyl maleimide, N-t-butyl maleimide, N-cyclohexyl maleimide, N-chlorophenyl maleimide, N-methylphenyl maleimide, N-bromophenyl maleimide, N-naphthyl maleimide, N-lauryl maleimide, N-hydroxyphenyl maleimide, N-methoxyphenyl maleimide, N-carboxyphenyl maleimide, N-nitrophenyl maleimide, and N-benzyl maleimide.

2. The adhesive composition as claimed in claim 1, wherein the (meth)acrylic acid ester having a hydroxyl group is at least one selected from the group of 2-hydroxyethyl (meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethyleneglycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl(meth)acrylate, 4-hydroxycyclohexyl(meth)acrylate, 2-hydroxy-3-phenyloxy(meth)acrylate, 4-hydroxycyclohexyl(meth)acrylate, and cyclohexane dimethanol mono (meth)acrylate.

3. The adhesive composition as claimed in claim 1, wherein the furyl based group is a furyl group, a tetrahydrofuryl group, a furfuryl group, or a tetrahydrofurfuryl group.

4. The adhesive composition as claimed in claim 1, wherein the compound having a furyl based group is at least one selected from the group of furfuryl isocyanate, tetrahydrofurfuryl isocyanate, and a compound having the following Formula 3:

$$CH_2=CR-C(=O)O-R1, \qquad \text{<Formula 3>}$$

wherein R is —H or —$(CH_2)n$-$CH_3$, n is an integer of 0 to about 5, and R1 is a furyl group, a tetrahydrofuryl group, a furfuryl group, or a tetrahydrofurfuryl group.

5. The adhesive composition as claimed in claim 1, wherein the acrylic copolymer also has at least one of a silane group and a carboxylic group.

6. The adhesive composition as claimed in claim 5, wherein:
the acrylic copolymer has the silane group, and
the acrylic copolymer is a copolymer of monomers that include:
a monomer having a silane group.

7. The adhesive composition as claimed in claim 6, wherein the monomer having a silane group is at least one selected from the group of 3-isocyanatopropyl trimethoxysilane, 3-isocyanatopropyl triethoxysilane, vinyl trichlorosilane, vinyl trimethoxysilane, and vinyl triethoxysilane.

8. The adhesive composition as claimed in claim 5, wherein:
the acrylic copolymer has the carboxylic group, and
the acrylic copolymer is a copolymer of monomers that include:
a monomer having a carboxylic group.

9. The adhesive composition as claimed in claim 8, wherein the monomer having a carboxylic group has the following Formula 5:

$$CH_2=CR-C(=O)O-(CH_2)_r-COOH, \qquad \text{<Formula 5>}$$

wherein R is —H or —$(CH_2)_n$—$CH_3$, n is an integer of 0 to about 5, and r is an integer of 1 to about 10.

10. The adhesive composition as claimed in claim 1, wherein the acrylic copolymer is a copolymer of monomers that include monomers having the following Formulae 1, 2, and 3:

$$CH_2=CR-C(=O)O-(CH_2)_p-CH_3, \qquad \text{<Formula 1>}$$

wherein R is —H or —$(CH_2)_n$—$CH_3$, n is an integer of 0 to about 5, and p is an integer of 0 to about 20;

$$CH_2=CR-C(=O)O-(CH_2)_q-OH, \qquad \text{<Formula 2>}$$

wherein R is —H or —$(CH_2)_n$—$CH_3$, n is an integer of 0 to about 5, and q is an integer of 1 to about 20;

$$CH_2=CR-C(=O)O-R1, \qquad \text{<Formula 3>}$$

wherein R is —H or —$(CH_2)_n$—$CH_3$, n is an integer of 0 to about 5, and R1 is a furyl group, a tetrahydrofuryl group, a furfuryl group, or a tetrahydrofurfuryl group.

11. The adhesive composition as claimed in claim 10, wherein:
the acrylic copolymer also has a silane group, and
the acrylic copolymer is a copolymer of the monomers that include monomers having the Formulae 1, 2, and 3 and a monomer having the following Formula 4:

$$(R2)(R3)(R4)Si-(CH_2)_s-R5, \qquad \text{<Formula 4>}$$

wherein R2, R3, and R4 are halogen or an alkoxy group having 1 to 5 carbon atoms, s is from 0 to about 10, R5 is a vinyl group when s is 0, and R5 is —NCO when s is 1 to about 10.

12. The adhesive composition as claimed in claim 10, wherein:
the acrylic copolymer also has a carboxyl group, and
the acrylic copolymer is a copolymer of the monomers that include monomers having the Formulae 1, 2, and 3 and a monomer having the following Formula 5:

$$CH_2=CR-C(=O)O-(CH_2)_r-COOH, \qquad \text{<Formula 5>}$$

wherein R is —H or —$(CH_2)_n$—$CH_3$, n is an integer of 0 to about 5, and r is an integer of 1 to about 10.

13. The adhesive composition as claimed in claim 1, wherein the curing agent is included in an amount of about 0.1 part to about 10 parts by weight based on 100 parts by weight of the acrylic copolymer.

14. The adhesive composition as claimed in claim 1, wherein the curing agent is at least one selected from the group of 2,4-tolylene diisocyanate, 2,6-tolylene diisocyanate, hydrogenated tolylene diisocyanate, 1,3-xylene diisocyanate, 1,4-xylene diisocyanate, diphenylmethane-4,4-diisocyanate, 1,3-bisisocyanatomethyl cyclohexane, tetramethylxylene diisocyanate, 1,5-naphthalene diisocyanate, 2,2,4-trimethyl hexamethylene diisocyanate, tolylene diisocyanate adduct of trimethylolpropane, xylene diisocyanate adduct of trimethylolpropane, triphenylmethanetriisocyante, and methylene bis (triisocyanate).

15. The adhesive composition as claimed in claim 1, further comprising a silane coupling agent.

16. A polarizer film comprising the adhesive composition as claimed in claim 1.

17. The adhesive composition as claimed in claim 1, wherein the furyl based group is one or more of a furyl group, a tetrahydrofuryl group, or a furfuryl group.

* * * * *